United States Patent
Jeong

(10) Patent No.: US 11,840,278 B2
(45) Date of Patent: Dec. 12, 2023

(54) VEHICLE IMPACT ENERGY ABSORPTION SYSTEM

(71) Applicants: Hyundai Motor Company, Seoul (KR); Kia Corporation, Seoul (KR)

(72) Inventor: Seung Min Jeong, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 261 days.

(21) Appl. No.: 17/443,502

(22) Filed: Jul. 27, 2021

(65) Prior Publication Data

US 2022/0097767 A1 Mar. 31, 2022

(30) Foreign Application Priority Data

Sep. 29, 2020 (KR) .................. 10-2020-0127562

(51) Int. Cl.
  *B62D 21/15* (2006.01)
  *B60K 1/04* (2019.01)
  *B62D 21/03* (2006.01)

(52) U.S. Cl.
  CPC .............. *B62D 21/155* (2013.01); *B60K 1/04* (2013.01); *B62D 21/03* (2013.01); *B60K 2001/0438* (2013.01)

(58) Field of Classification Search
  CPC ...... B62D 21/155; B62D 21/03; B62D 21/11; B62D 25/082; B62D 21/15; B60K 1/04; B60K 2001/0438; B60K 1/00; B60K 2001/001; B60Y 2306/01; B60Y 2200/91; Y02T 10/70

USPC ...................................................... 296/187.09
See application file for complete search history.

(56) References Cited

U.S. PATENT DOCUMENTS

| | | | | |
|---|---|---|---|---|
| 8,602,454 | B1* | 12/2013 | Baccouche | B60K 1/04 180/68.5 |
| 9,016,424 | B2* | 4/2015 | Awano | B62D 25/082 180/274 |
| 9,834,079 | B2* | 12/2017 | Nishikawa | B60K 1/04 |
| 9,975,416 | B2* | 5/2018 | Hara | B62D 25/20 |
| 2017/0057556 | A1* | 3/2017 | Vollmer | B60L 50/64 |
| 2021/0403089 | A1* | 12/2021 | Shah | B62D 25/082 |
| 2022/0340206 | A1* | 10/2022 | Song | B60R 19/34 |

FOREIGN PATENT DOCUMENTS

CN 102458891 A * 5/2012 ............... B60K 1/00

* cited by examiner

*Primary Examiner* — Pinel E Romain
(74) *Attorney, Agent, or Firm* — SLATER MATSIL, LLP

(57) ABSTRACT

An embodiment vehicle impact energy absorption system includes a pair of front side members, a battery assembly disposed under a center floor of a vehicle, a front subframe disposed below the pair of front side members and located in front of the battery assembly, the front subframe being connected to the pair of front side members through a pair of support arms and a pair of support brackets, wherein each support arm of the pair of support arms is provided on the front subframe, and each support bracket of the pair of support brackets is provided on each front side member of the pair of front side members, respectively, and an electric motor mounted on the front subframe.

19 Claims, 11 Drawing Sheets

VEHICLE IMPACT ENERGY ABSORPTION SYSTEM

CROSS-REFERENCE TO RELATED APPLICATIONS

This application claims the benefit of priority to Korean Application No. 10-2020-0127562, filed on Sep. 29, 2020, which application is hereby incorporated herein by reference.

TECHNICAL FIELD

The present disclosure relates to a vehicle impact energy absorption system.

BACKGROUND

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle includes an electric motor located in a front compartment of the vehicle, and a battery assembly mounted to a floor of the vehicle. The electric motor may drive front wheels of the vehicle, and the battery assembly may supply electricity to the electric motor and other electric/electronic components. The battery assembly includes one or more battery cells (or battery modules), electric/electronic components associated with the battery cells, a battery case in which the battery cells and the electric/electronic components are received, and a cover with which the top of the battery case is covered.

In the battery assembly of the electric vehicle, leakage of a coolant from a cooling line due to external impacts or interference between the battery cells may be likely to cause a fire. In order to safely protect the battery assembly even in the event of a vehicle impact/collision, battery protection law (regulations) has been established. An internal combustion engine vehicle only considers the absorption of impact energy, but the electric vehicle must consider not only the absorption of impact energy, but also the protection of the battery assembly according to the battery protection law.

The capacity of the battery assembly increases in order to increase the range of the electric vehicle. Accordingly, as the size of the battery assembly increases, the battery assembly may protrude toward the front of the vehicle. Thus, it is necessary to consider the protection of the battery assembly more important in designing the vehicle.

In a conventional electric vehicle, the electric motor is rigidly mounted between a chassis and a front subframe, so the electric motor and the front subframe serve as rigid bodies in the event of a vehicle impact/collision, thereby significantly reducing an energy absorption amount of the front subframe. The front subframe is likely to hit a front end portion of the battery assembly. As a result, the battery assembly may not be safely protected.

The above information described in this background section is provided to assist in understanding the background of the inventive concept, and may include any technical concept which is not considered as the prior art that is already known to those skilled in the art.

SUMMARY

The present disclosure relates to a vehicle impact energy absorption system. Particular embodiments relate to a vehicle impact energy absorption system capable of protecting a battery assembly and absorbing impact energy in the event of a vehicle impact/collision. Embodiments of the present disclosure can solve problems occurring in the prior art while advantages achieved by the prior art are maintained intact.

An embodiment of the present disclosure provides a vehicle impact energy absorption system that allows an electric motor to be separated from a front subframe and makes the front subframe rotate upwardly in the event of a vehicle impact/collision, thereby preventing the front subframe from colliding with a battery assembly, and maximizing the distribution and absorption of impact energy.

According to an embodiment of the present disclosure, a vehicle impact energy absorption system may include a pair of front side members, a battery assembly disposed under a center floor of a vehicle, a front subframe disposed below the pair of front side members and located in front of the battery assembly, and an electric motor mounted on the front subframe. The front subframe may be connected to the pair of front side members through a pair of support arms and a pair of support brackets, each support arm may be provided on the front subframe, and each support bracket may be provided on each front side member.

The support arm may be pivotally connected to the support bracket through a pivot pin.

The pair of support arms and the pair of support brackets may be located behind a front mounting portion of the front subframe so that the pair of support arms and the pair of support brackets may suppress a rear portion of the front subframe from being deformed in the event of a frontal impact/collision of the vehicle.

The front subframe may include a pair of longitudinal members, a front crossmember connecting front portions of the pair of longitudinal members, and a rear crossmember connecting rear portions of the pair of longitudinal members. The support arm may protrude from each longitudinal member, the support bracket may protrude from each front side member toward the support arm, and the pivot pin may extend through the support arm and the support bracket.

The support bracket may include a front wall facing the front of the vehicle, a pair of sidewalls extending from both edges of the front wall toward the rear of the vehicle, and a rear opening opposing the front wall. The pivot pin may extend through the pair of sidewalls and the support arm.

The longitudinal member may include a notch that induces the longitudinal member to be deformed into a V-like shape in the event of a frontal impact/collision of the vehicle.

The notch may be recessed from a top surface of the longitudinal member toward the bottom of the vehicle.

The notch may be located in front of the support arm.

A front edge of the electric motor may be connected to a front crossmember of the front subframe through a front connection portion.

A rear edge of the electric motor may be pivotally connected to a rear crossmember of the front subframe through a rear connection portion.

The pair of support arms may be located between the front connection portion and the rear connection portion in a longitudinal direction of the vehicle.

The rear connection portion may include a rear pivot arm protruding from the rear edge of the electric motor toward the rear of the vehicle, a pair of rear pivot lugs protruding upwardly from the rear crossmember of the front subframe, and a rear pivot pin extending through the rear pivot arm and the pair of rear pivot lugs.

The rear pivot arm may be separated from the pair of rear pivot lugs in the event of a frontal impact/collision of the vehicle.

Each rear pivot lug may have a through hole through which the rear pivot pin passes, and a slot extending from the through hole toward the rear of the vehicle, and a width of the slot may be less than a diameter of the through hole.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
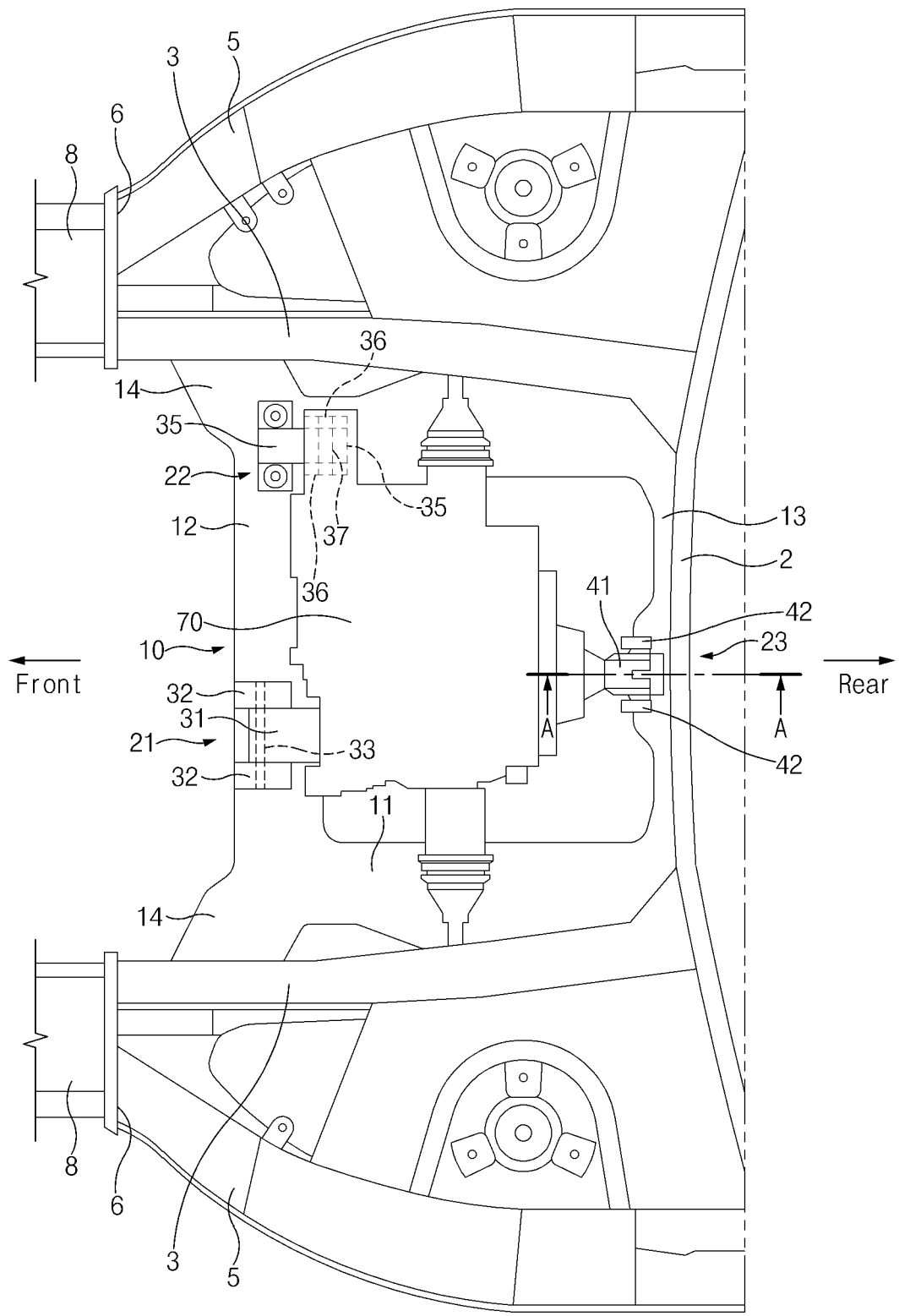
FIG. 1 illustrates a plan view of a vehicle impact energy absorption system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a structure of a vehicle impact energy absorption system according to an exemplary embodiment of the present disclosure, which is located in front of a dash panel 2. The dash panel 2 may serve as a partition that separates a front compartment from a passenger compartment, and an electric motor 70, a transmission, a heat exchanger, and the like may be disposed in the front compartment.

Figure 4:
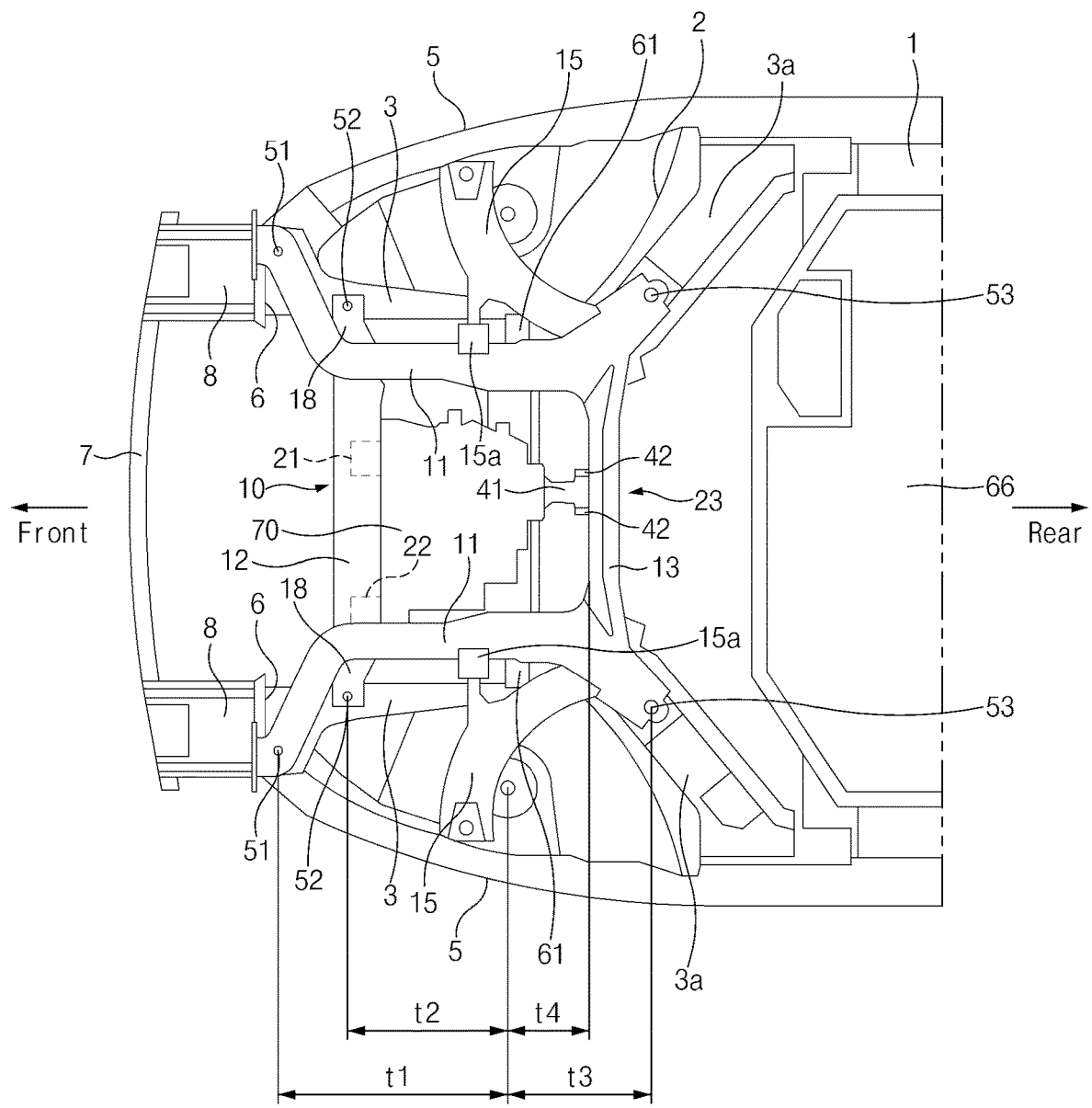
FIG. 4 illustrates a bottom view of a vehicle impact energy absorption system according to an exemplary embodiment of the present disclosure.

Referring to FIG. 1, a pair of front side members 3 may be disposed on the front of the vehicle. The pair of front side members 3 may be spaced apart from each other in a width direction of the vehicle, and each front side member 3 may extend in a longitudinal direction of the vehicle. Each front side member 3 may extend through a bottom portion of the dash panel 2. A pair of front pillars (not shown) may be connected to both edges of the dash panel 2. A pair of fender apron members 5 may be spaced apart from each other in the width direction of the vehicle, and each fender apron member 5 may extend from the corresponding front pillar to a front end of the corresponding front side member 3. Referring to FIG. 4, both ends of a front bumper beam 7 may be mounted on a pair of bumper beam mounting brackets 6 through a pair of crash boxes 8. As illustrated in FIG. 1, a front end of the fender apron member 5 and the front end of the front side member 3 may be mounted on the corresponding bumper beam mounting bracket 6 by welding, using fasteners, and/or the like.

Referring to FIGS. 1 and 4, a front subframe 10 may be disposed below the pair of front side members 3. The front subframe 10 may include a pair of longitudinal members 11, a front crossmember 12 connecting front portions of the pair of longitudinal members 11, a rear crossmember 13 connecting rear portions of the pair of longitudinal members 11, and a pair of front extension portions 14 extending from the pair of longitudinal members 11 toward the front of the vehicle. Each longitudinal member 11 may extend in the longitudinal direction of the vehicle, and the longitudinal member 11 may be disposed below the corresponding front side member 3. The front crossmember 12 and the rear crossmember 13 may extend in the width direction of the vehicle, and the front extension portions 14 may extend from the longitudinal members 11 toward the front of the vehicle, respectively.

Figure 6:
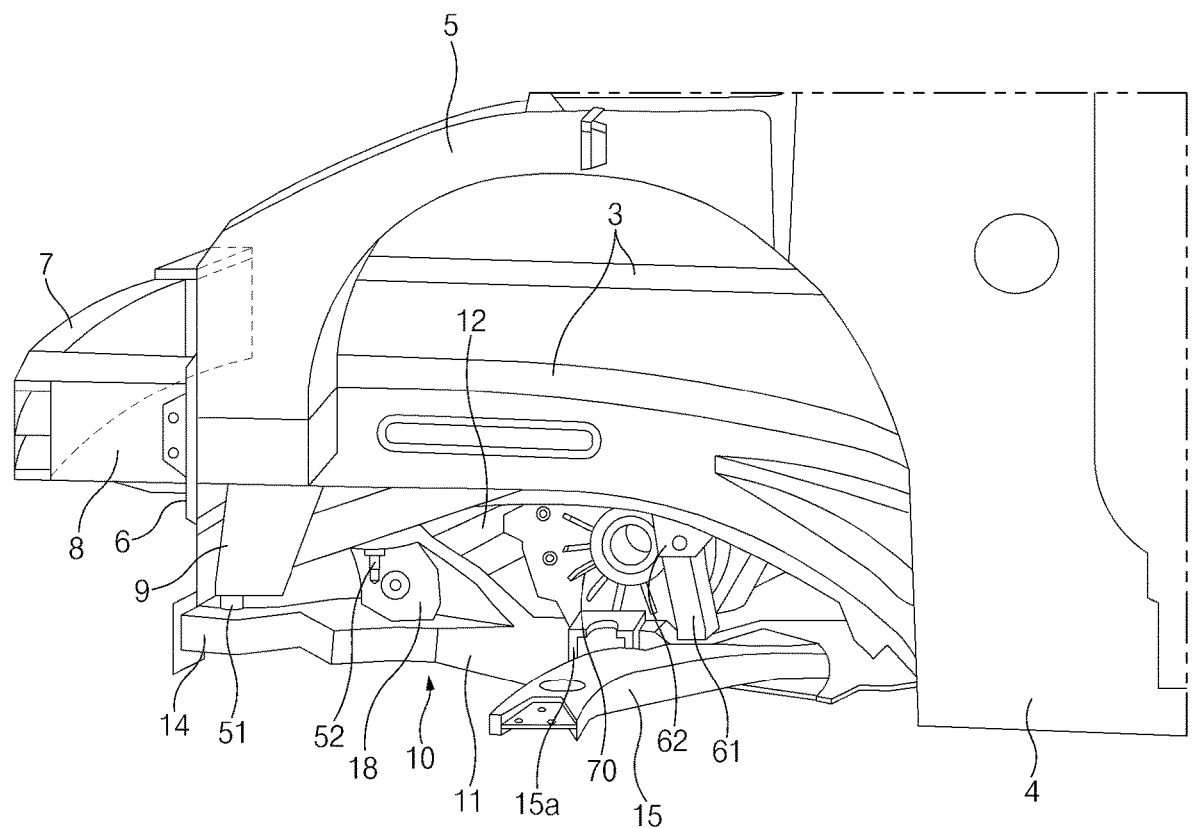
FIG. 6 illustrates a left-side perspective view of a vehicle impact energy absorption system according to an exemplary embodiment of the present disclosure.
Figure 7:
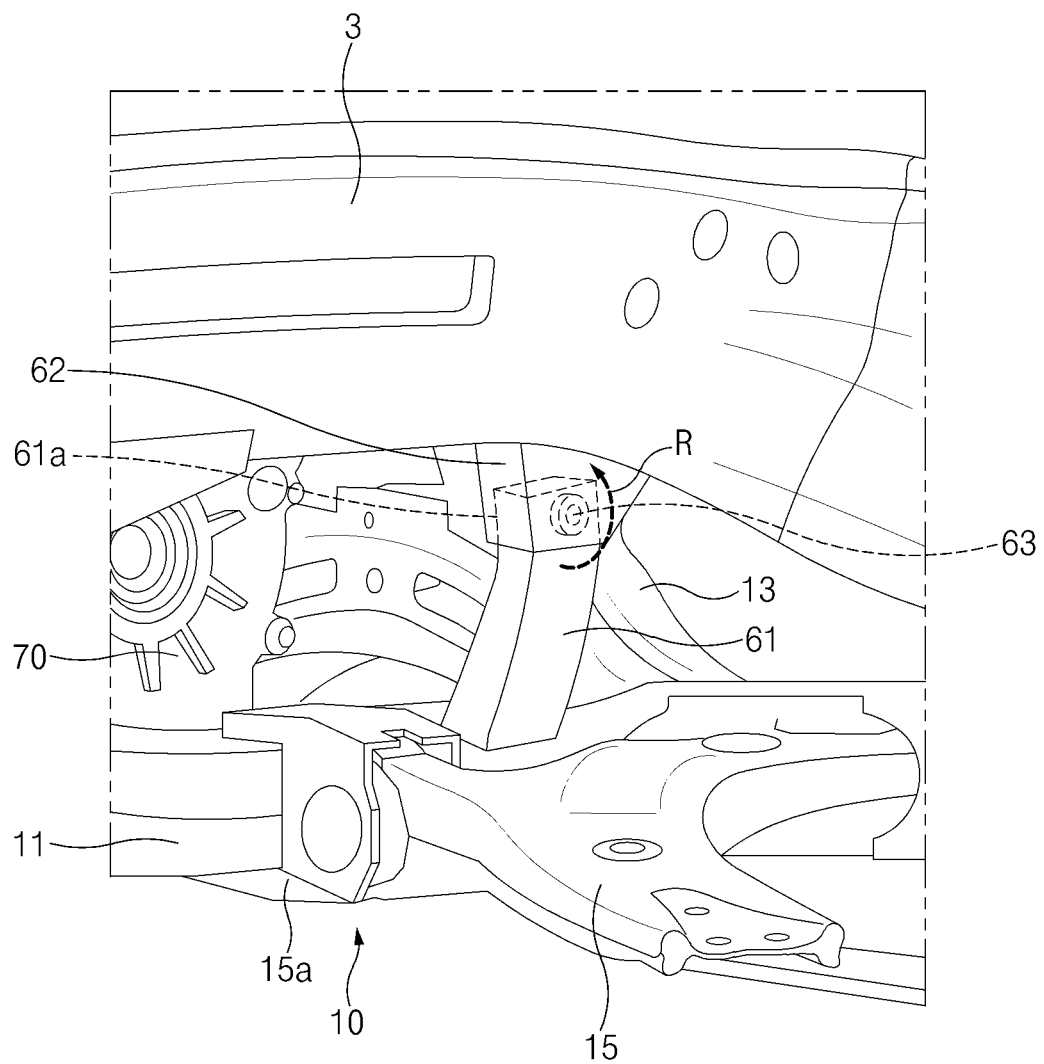
FIG. 7 illustrates a perspective view of a support arm and a support bracket in a vehicle impact energy absorption system according to an exemplary embodiment of the present disclosure.
Figure 8:
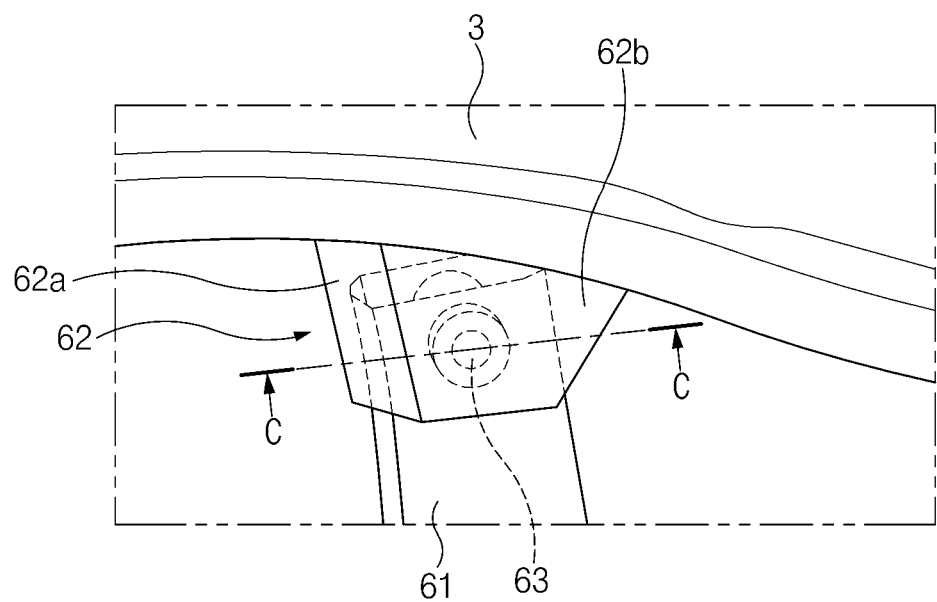
FIG. 8 illustrates a perspective view of a structure in which a top end of a support arm is connected to a support bracket through a pivot pin in a vehicle impact energy absorption system according to an exemplary embodiment of the present disclosure.

Referring to FIGS. 4 and 6, a pair of attachment arms 18 may protrude from the pair of longitudinal members 11, respectively, and each attachment arm 18 may protrude from the longitudinal member 11 toward the front side member 3. A pair of lower control arms 15 may be connected to the pair of longitudinal members 11, respectively. A front end of the lower control arm 15 may be mounted on a central portion of the longitudinal member 11 through a mounting bracket 15a, and a rear end of the lower control arm 15 may be mounted on the rear portion of the longitudinal member 11.

Referring to FIGS. 1 to 4, the front subframe 10 may include a pair of front mounting portions 51 mounted on a pair of subframe mounting brackets 9, a pair of central mounting portions 52 mounted on central portions of the pair of front side members 3, and a pair of rear mounting portions 53 mounted on rear extension portions 3a of the pair of front side members 3. Each front mounting portion 51 may be provided on a front portion of the front extension portion 14, each central mounting portion 52 may be provided on a top end of the attachment arm 18, and each rear mounting portion 53 may be provided on a rear end of the longitudinal member 11.

Referring to FIG. 4, a battery assembly 66 may be located behind the front subframe 10, and the battery assembly 66 may be disposed under a center floor 1.

Referring to FIG. 6, the pair of subframe mounting brackets 9 may be attached to the pair of bumper beam mounting brackets 6, respectively. Each front side member 3 may have the rear extension portion 3a extending toward the rear of the vehicle, and the rear extension portion 3a may be curved from a rear end of the front side member 3 toward the rear of the vehicle.

Referring to FIGS. 1 and 4, the electric motor 70 may be mounted on the front subframe 10. A front edge of the electric motor 70 may be connected to the front crossmember 12 of the front subframe 10, and a rear edge of the electric motor 70 may be connected to the rear crossmember 13 of the front subframe 10.

According to an exemplary embodiment, the front edge of the electric motor 70 may be connected to the front subframe 10 through one or more front connection portions 21 and 22. Specifically, the front edge of the electric motor 70 may be pivotally connected to the front crossmember 12 of the front subframe 10 through a first front connection portion 21 and a second front connection portion 22, and the first front connection portion 21 and the second front connection portion 22 may be spaced apart from each other in the width direction of the vehicle. As illustrated in FIG. 1, the first front connection portion 21 may be adjacent to the left side of the vehicle, and the second front connection portion 22 may be adjacent to the right side of the vehicle.

Referring to FIG. 1, the first front connection portion 21 may include a first front pivot arm 31 protruding from the front edge of the electric motor 70 toward the front crossmember 12 of the front subframe 10, a pair of first front pivot lugs 32 protruding upwardly from the front crossmember 12 of the front subframe 10, and a first front pivot pin 33 extending through the first front pivot arm 31 and the pair of first front pivot lugs 32. The first front pivot arm 31 may be interposed between the pair of first front pivot lugs 32, and the first front pivot pin 33 may pass through the pair of first front pivot lugs 32 and the first front pivot arm 31. The first front pivot pin 33 may extend in the width direction of the vehicle, and the first front pivot arm 31 and/or the first front pivot lugs 32 may pivot around the first front pivot pin 33.

Referring to FIG. 1, the second front connection portion 22 may include a second front pivot arm 35 protruding from the front crossmember 12 of the front subframe 10 toward the electric motor 70, a pair of second front pivot lugs 36 protruding downwardly from the front edge of the electric motor 70, and a second front pivot pin 37 extending through the second front pivot arm 35 and the pair of second front pivot lugs 36. The second front pivot arm 35 may be interposed between the pair of second front pivot lugs 36, and the second front pivot pin 37 may pass through the pair of second front pivot lugs 36 and the second front pivot arm 35. The second front pivot pin 37 may extend in the width direction of the vehicle, and the second front pivot arm 35 and/or the second front pivot lugs 36 may pivot around the second front pivot pin 37.

As the first front pivot arm 31 protrudes from the front edge of the electric motor 70 and the second front pivot arm 35 protrudes from the front crossmember 12 of the front subframe 10, the front edge of the electric motor 70 may be firmly connected to the front crossmember 12 of the front subframe 10.

Figure 11:
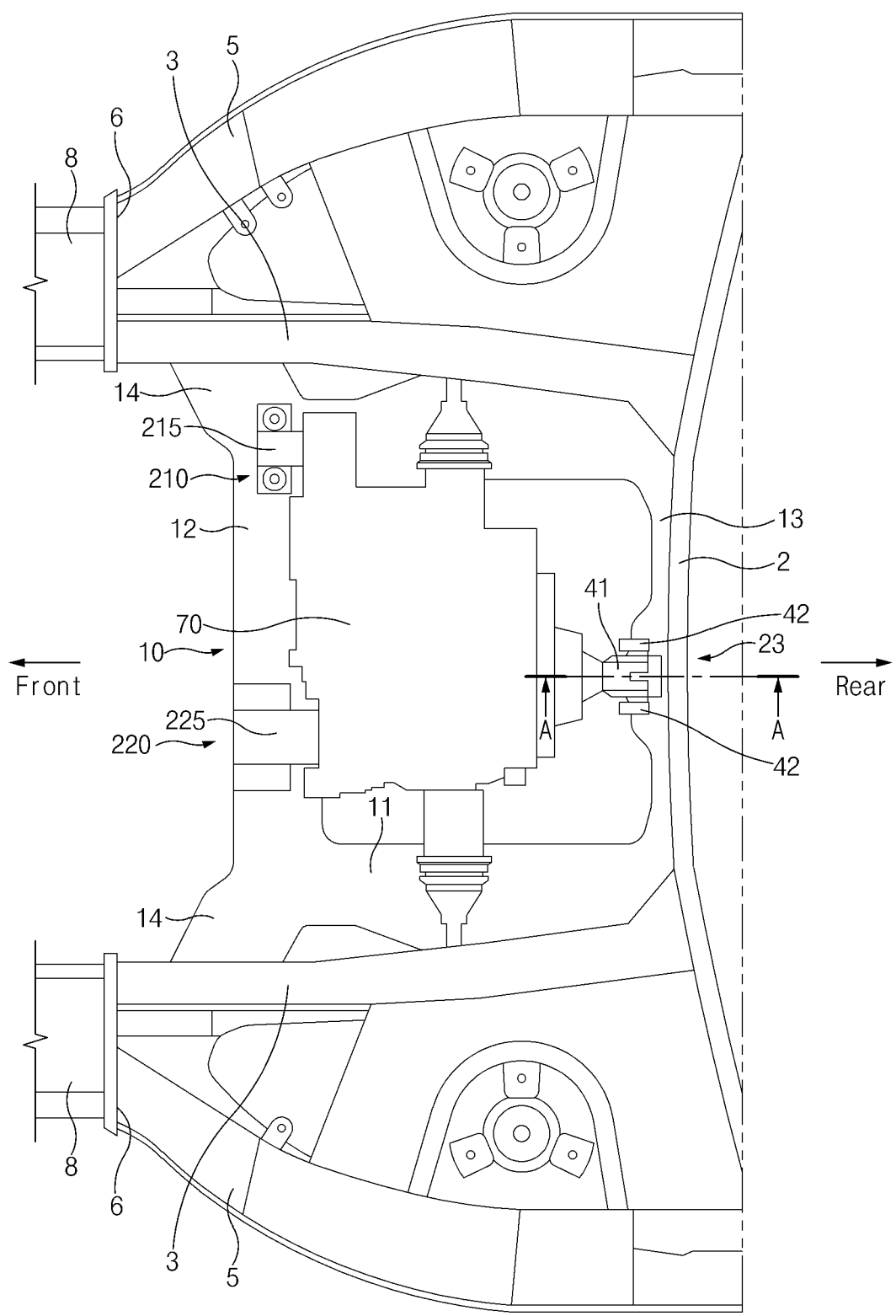
FIG. 11 illustrates a plan view of a vehicle impact energy absorption system according to another exemplary embodiment of the present disclosure.

According to another exemplary embodiment, the front edge of the electric motor 70 may be rigidly connected to the front crossmember 12 of the front subframe 10 through a first front connection portion 210 and a second front connection portion 220 as illustrated in FIG. 11. The first front connection portion 210 may include a first front fixing bracket 215 rigidly connecting the front edge of the electric motor 70 and the front crossmember 12 of the front subframe 10. One end of the first front fixing bracket 215 may be fixed to the front edge of the electric motor 70, and the other end of the first front fixing bracket 215 may be fixed to the front crossmember 12. The second front connection portion 220 may include a second front fixing bracket 225 rigidly connecting the front edge of the electric motor 70 and the front crossmember 12 of the front subframe 10. One end of the second front fixing bracket 225 may be fixed to the front edge of the electric motor 70, and the other end of the second front fixing bracket 225 may be fixed to the front crossmember 12. The first front connection portion 210 and the second front connection portion 220 may be spaced apart from each other in the width direction of the vehicle. As illustrated in FIG. 11, the first front connection portion 210 may be adjacent to the right side of the vehicle, and the second front connection portion 220 may be adjacent to the left side of the vehicle.

According to an exemplary embodiment of the present disclosure, the rear edge of the electric motor 70 may be pivotally connected to the front subframe 10 through a rear connection portion 23.

Figure 2:
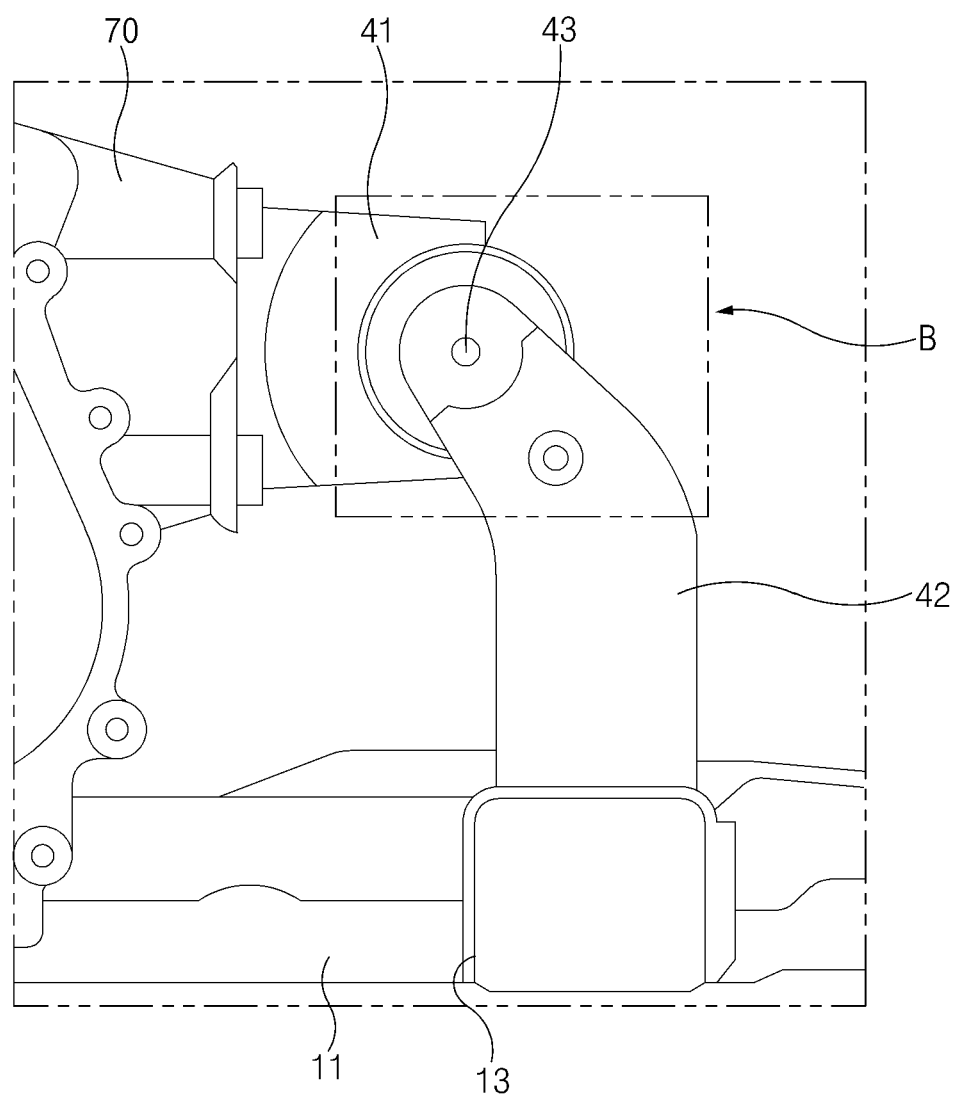
FIG. 2 illustrates a cross-sectional view, taken along line A-A of FIG. 1.

Referring to FIGS. 1 and 2, the rear connection portion 23 may include a rear pivot arm 41 protruding from the rear edge of the electric motor 70 toward the rear of the vehicle, a pair of rear pivot lugs 42 protruding upwardly from the rear crossmember 13 of the front subframe 10, and a rear pivot pin 43 extending through the rear pivot arm 41 and the pair of rear pivot lugs 42. A top end 42a of each rear pivot lug 42 may be bent toward the electric motor 70, and the rear pivot arm 41 may be interposed between the pair of rear pivot lugs 42. The rear pivot pin 43 may pass through the pair of rear pivot lugs 42 and the rear pivot arm 41. The rear pivot pin 43 may extend in the width direction of the vehicle, and the rear pivot arm 41 and/or the rear pivot lugs 42 may pivot around the rear pivot pin 43.

Referring to FIG. 4, the first front connection portion 21 and the second front connection portion 22 may be located behind the front mounting portion 51 of the front subframe 10 in the longitudinal direction of the vehicle, and the rear connection portion 23 may be located in front of the rear mounting portion 53 of the front subframe 10 in the longitudinal direction of the vehicle.

Referring to FIGS. 5 to 10, the front subframe 10 may be connected to the pair of front side members 3 through a pair of support arms 61 and a pair of support brackets 62, and each support arm 61 may be pivotally connected to the corresponding support bracket 62 through a pivot pin 63. The pair of support arms 61 and the pair of support brackets 62 may induce the front subframe 10 to rotate upwardly in the event of a frontal impact/collision of the vehicle.

Figure 9:
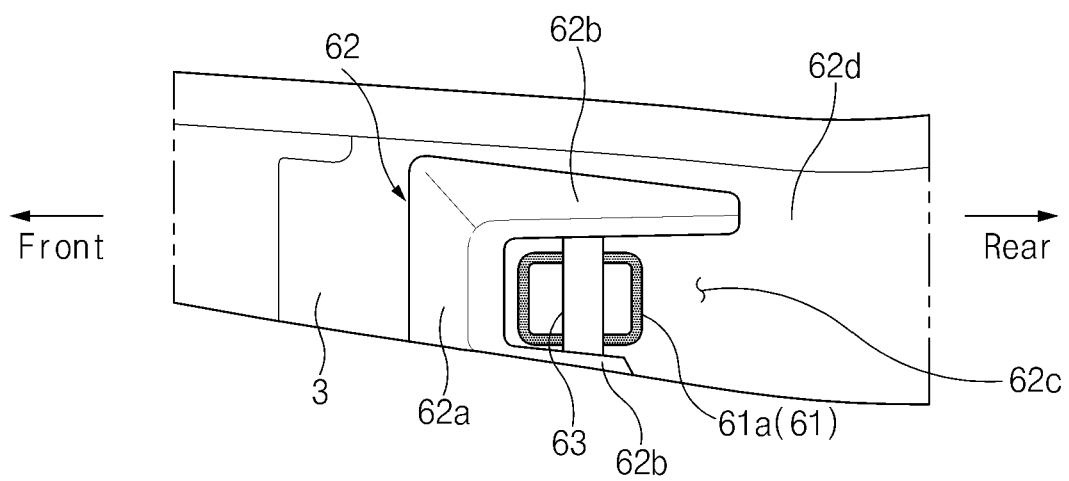
FIG. 9 illustrates a cross-sectional view, taken along line C-C of FIG. 8.

Each support arm 61 may extend from the corresponding longitudinal member 11 of the front subframe 10 toward the corresponding front side member 3, and each support bracket 62 may protrude from a bottom surface of the front side member 3 toward the support arm 61. A top end 61a of the support arm 61 may be received in the support bracket 62, and the pivot pin 63 may extend through the top end 61*a* of the support arm 61 and the support bracket 62. Referring to FIG. 9, the support bracket 62 may include a front wall 62*a* facing the front of the vehicle, a pair of sidewalls 62*b* extending from both edges of the front wall 62*a*, and a rear opening 62*c* opposing the front wall 62*a*. The pivot pin 63 may extend in the width direction of the vehicle, and the support arm 61 and/or the support bracket 62 may pivot around the pivot pin 63. Specifically, the pivot pin 63 may pass through the pair of sidewalls 62*b* and the top end 61*a* of the support arm 61, the front wall 62*a* and the pair of sidewalls 62*b* may define a space receiving the top end 61*a* of the support arm 61, and the rear opening 62*c* may face the rear of the vehicle. During the frontal impact/collision of the vehicle, as a load is transferred to the front subframe 10, the front subframe 10 may move toward the rear of the vehicle, and the support arms 61 may rotate around the pivot pins 63. In particular, the support arm 61 may rotate upwardly through the rear opening 62*c* of the support bracket 62 (see a direction indicated by arrow R in FIG. 7). As the front subframe 10 rotates upwardly, the front subframe 10 may collide with the dash panel 2, and thus the front subframe 10 may avoid colliding with the battery assembly 66.

Figure 5:
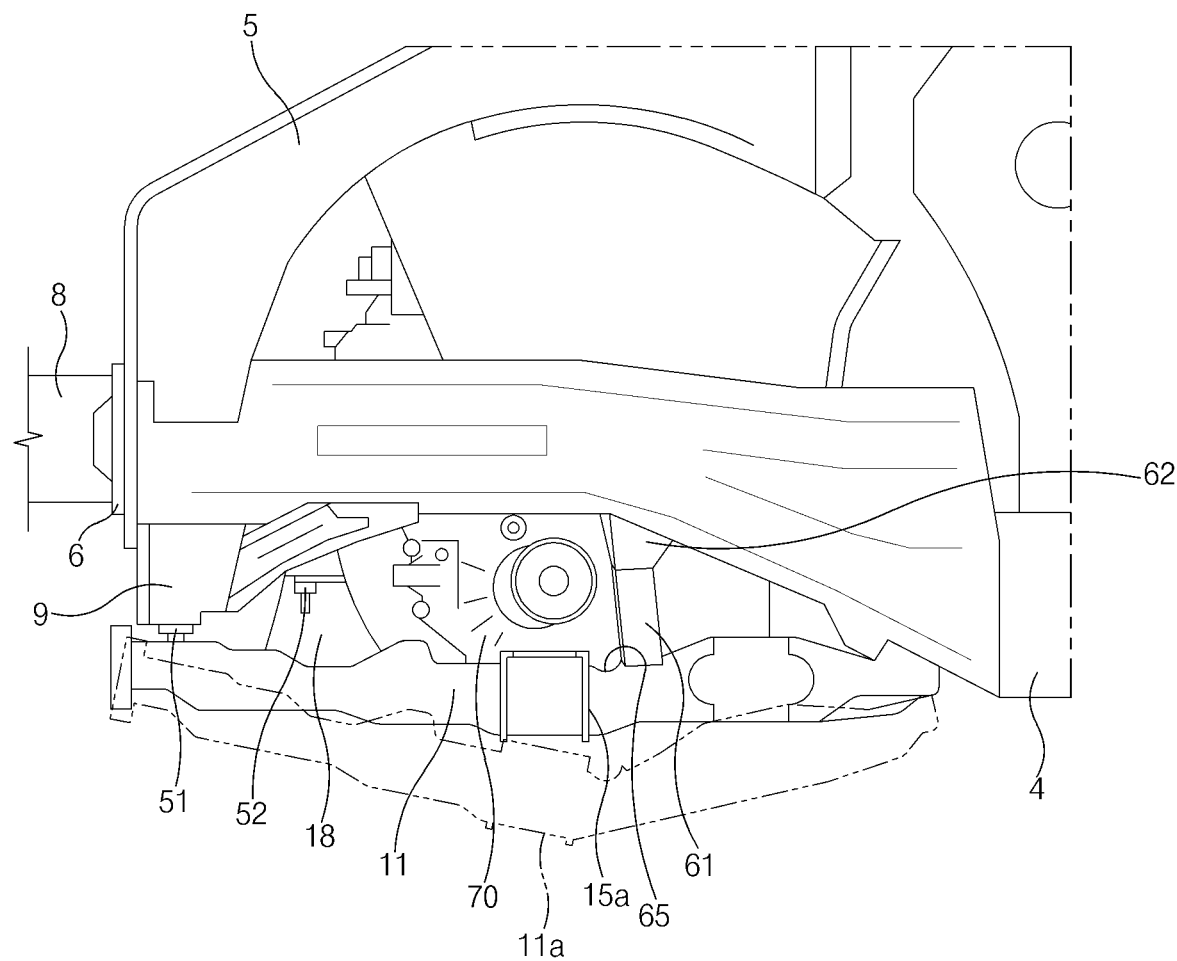
FIG. 5 illustrates a left side view of a vehicle impact energy absorption system according to an exemplary embodiment of the present disclosure.

Referring to FIGS. 4 to 6, the support arm 61 may extend from the central portion of the longitudinal member 11 of the front subframe 10. The support arm 61 and the support bracket 62 may be located between the central mounting portion 52 and the rear mounting portion 53 of the front subframe 10 in the longitudinal direction of the vehicle. The pair of support arms 61 and the pair of support brackets 62 may be located behind the front portion of the front subframe 10, and the pair of support arms 61 and the pair of support brackets 62 may be located in front of the rear portion of the front subframe 10. Specifically, the support arms 61 and the support brackets 62 may be located between the first and second front connection portions 21 and 22 and the rear connection portion 23. Referring to FIG. 4, the support arm 61 may be spaced apart from the front mounting portion 51 toward the rear of the vehicle by a first gap t1, and the support arm 61 may be spaced apart from the first and second front connection portions 21 and 22 toward the rear of the vehicle by a second gap t2. The support arm 61 may be spaced apart from the rear mounting portion 53 toward the front of the vehicle by a third gap t3, and the support arm 61 may be spaced apart from the rear connection portion 23 toward the front of the vehicle by a fourth gap t4.

Figure 10:
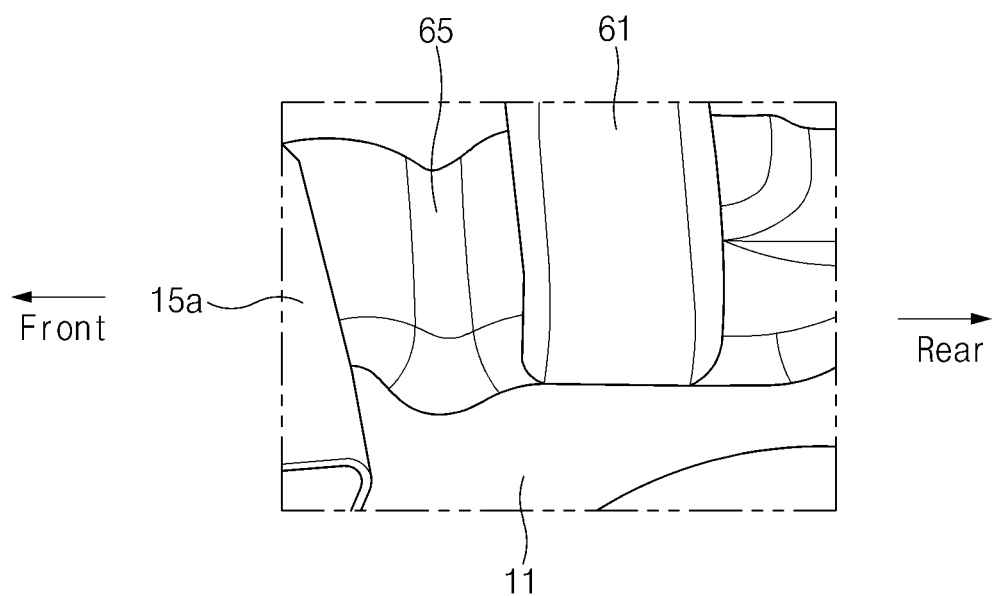
FIG. 10 illustrates a perspective view of a notch located in front of a support arm in a vehicle impact energy absorption system according to an exemplary embodiment of the present disclosure.

Each longitudinal member 11 may include a notch 65 that induces the longitudinal member 11 to be deformed into a V-like shape in the event of a frontal impact/collision of the vehicle. Specifically, the notch 65 may be recessed from a top surface of the longitudinal member 11 toward the bottom of the vehicle, and the notch 65 may be located in front of the support arm 61. Referring to FIG. 10, the notch 65 may be located between the support arm 61 and the mounting bracket 15*a* for mounting the front end of the lower control arm 15. When the load is transferred to the longitudinal member 11 during the frontal impact/collision of the vehicle, the longitudinal member 11 may be deformed into the V-like shape by the notch 65 (see portion 11*a* indicated by a two-dot chain line in FIG. 5).

Figure 3:
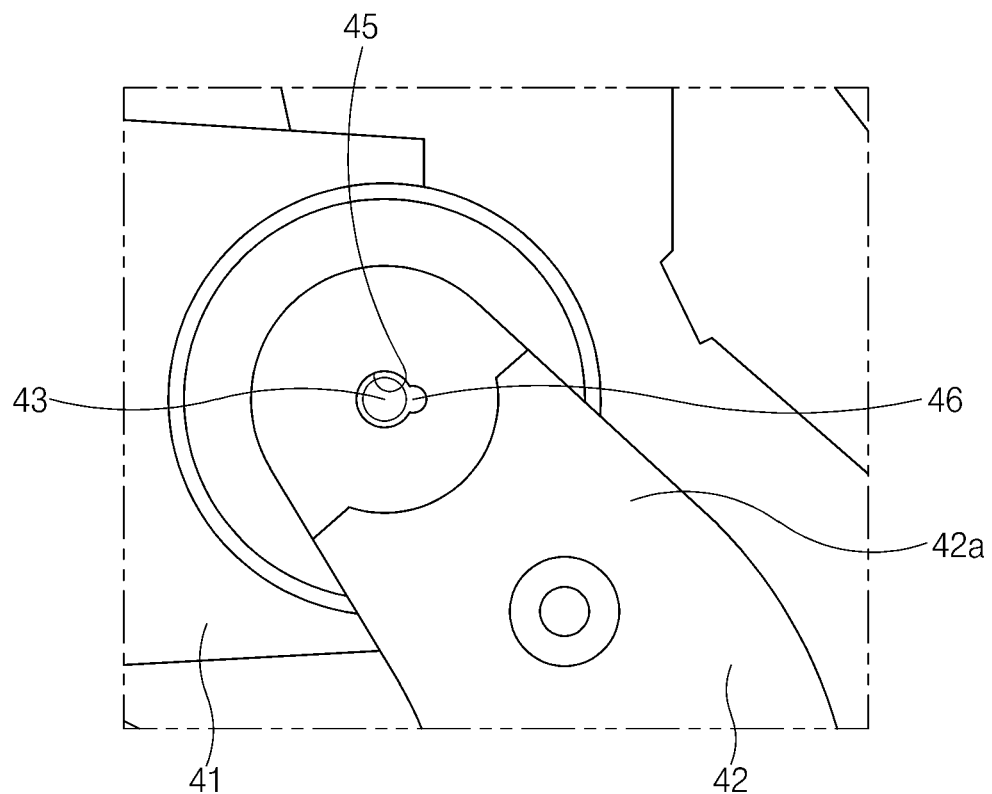
FIG. 3 illustrates an enlarged view of portion B of FIG. 2.

If the strength of the support arm 61 is sufficient, the rear connection portion 23 may be destroyed before the front portion of the front subframe 10 is deformed in the event of a frontal impact/collision of the vehicle, and thus the electric motor 70 may be separated from the front subframe 10. However, if the strength of the support arm 61 is insufficient, when the rear connection portion 23 is not destroyed even after the front portion of the front subframe 10 is deformed, the electric motor 70 may not be separated from the front subframe 10, and the upward rotation of the front subframe 10 may not be induced, and thus the front subframe 10 may move linearly toward the rear of the vehicle and hit a front end of the battery assembly 66. In order to separate the electric motor 70 from the front subframe 10 before the front portion of the front subframe 10 is deformed in the event of the frontal impact/collision of the vehicle, it may be necessary to induce breakage of the rear connection portion 23. Referring to FIG. 3, each rear pivot lug 42 may have a through hole 45 through which the rear pivot pin 43 passes, and a slot 46 extending from the through hole 45 toward the rear of the vehicle. A width of the slot 46 may be less than a diameter of the through hole 45. When the impact load is transferred to the electric motor 70 in the frontal impact/collision of the vehicle, the electric motor 70 may move toward the rear of the vehicle, and accordingly the rear pivot pin 43 may hit the slot 46, and the rear pivot lug 42 may be broken along the slot 46. That is, when the frontal impact/collision of the vehicle occurs, the rear pivot lug 42 may be broken by the slot 46, and the rear connection portion 23 may be completely broken. Due to the breakage of the rear connection portion 23, the rear edge of the electric motor 70 may be completely separated from the rear crossmember 13 of the front subframe 10.

According to the above-described embodiments of the present disclosure, the pair of support arms 61 and the pair of support brackets 62 may be located behind the front mounting portion 51 of the front subframe 10 and/or the first and second front connection portions 21 and 22. Accordingly, when the frontal impact/collision of the vehicle occurs, the pair of support arms 61 and the pair of support brackets 62 may induce the front portion of the front subframe 10 to be first deformed, and suppress the rear portion of the front subframe 10 from being deformed or suppress the front subframe 10 from moving toward the rear of the vehicle.

When the load generated in the frontal impact/collision of the vehicle is transferred along the longitudinal members 11 and the electric motor 70, the longitudinal members 11 may be bent (deformed) into the V-like shape by the notches 65 so that the impact energy may be absorbed, and the rear connection portion 23 may be broken so that the rear edge of the electric motor 70 may be separated from the rear crossmember 13 of the front subframe 10. Thus, the electric motor 70 may collide with the dash panel 2, and the impact energy may be dissipated.

As the load is transferred to the front subframe 10 during the frontal impact/collision of the vehicle, the front subframe 10 may move toward the rear of the vehicle, and the support arms 61 may rotate around the pivot pins 63. In particular, the support arms 61 may rotate upwardly through the rear openings 62*c* of the support brackets 62 (see the direction indicated by arrow R in FIG. 7). As the front subframe 10 rotates upwardly, the front subframe 10 may avoid a collision with the battery assembly 66.

As set forth above, the vehicle impact energy absorption system according to exemplary embodiments of the present disclosure may allow the electric motor to be separated from the front subframe and make the front subframe rotate upwardly in the event of a vehicle impact/collision, thereby preventing the front subframe from colliding with the battery assembly, and maximizing the distribution and absorption of impact energy.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle impact energy absorption system, the system comprising:
   a pair of front side members;
   a battery assembly disposed under a center floor of a vehicle;
   a front subframe disposed below the pair of front side members and located in front of the battery assembly, the front subframe being connected to the pair of front side members through a pair of support arms and a pair of support brackets, wherein each support arm of the pair of support arms is provided on the front subframe, and each support bracket of the pair of support brackets is provided on each front side member of the pair of front side members, respectively, and wherein each support arm of the pair of support arms is pivotally connected to each support bracket of the pair of support brackets through a pair of pivot pins, respectively; and
   an electric motor mounted on the front subframe.

2. The system according to claim 1, wherein:
   the front subframe includes a pair of longitudinal members, a front crossmember connecting front portions of the pair of longitudinal members, and a rear crossmember connecting rear portions of the pair of longitudinal members;
   each support arm of the pair of support arms protrudes from each longitudinal member of the pair of longitudinal members, respectively;
   each support bracket of the pair of support brackets protrudes toward each support arm of the pair of support arms from each front side member of the pair of front side members, respectively; and
   each pivot pin of the pair of pivot pins extends through each support arm of the pair of support arms and each support bracket of the pair of support brackets, respectively.

3. The system according to claim 2, wherein each longitudinal member of the pair of longitudinal members includes a notch that induces the longitudinal member to be deformed into a V-like shape in a frontal impact or collision event of the vehicle.

4. The system according to claim 3, wherein the notch is recessed from a top surface of the longitudinal member toward a bottom of the vehicle.

5. The system according to claim 3, wherein the notch is located in front of the support arm.

6. The system according to claim 1, wherein:
   each of the support brackets includes a front wall facing a front of the vehicle, a pair of sidewalls extending from both edges of the front wall toward a rear of the vehicle, and a rear opening opposing the front wall; and
   each of the pivot pins extends through the pair of sidewalls and the respective support arm.

7. The system according to claim 1, wherein the pair of support arms and the pair of support brackets are located behind a front mounting portion of the front subframe, wherein the pair of support arms and the pair of support brackets are configured to suppress a rear portion of the front subframe from being deformed in a frontal impact or collision event of the vehicle.

8. A vehicle impact energy absorption system, the system comprising:
   a pair of front side members;
   a battery assembly disposed under a center floor of a vehicle;
   a front subframe disposed below the pair of front side members and located in front of the battery assembly, the front subframe being connected to the pair of front side members through a pair of support arms and a pair of support brackets, wherein each support arm of the pair of support arms is provided on the front subframe, and each support bracket of the pair of support brackets is provided on each front side member of the pair of front side members, respectively; and
   an electric motor mounted on the front subframe, wherein a front edge of the electric motor is connected to a front crossmember of the front subframe through a front connection portion.

9. The system according to claim 8, wherein a rear edge of the electric motor is pivotally connected to a rear crossmember of the front subframe through a rear connection portion.

10. The system according to claim 9, wherein the pair of support arms are located between the front connection portion and the rear connection portion in a longitudinal direction of the vehicle.

11. The system according to claim 9, wherein the rear connection portion includes a rear pivot arm protruding from the rear edge of the electric motor toward a rear of the vehicle, a pair of rear pivot lugs protruding upwardly from the rear crossmember of the front subframe, and a rear pivot pin extending through the rear pivot arm and the pair of rear pivot lugs.

12. The system according to claim 11, wherein the rear pivot arm is separated from the pair of rear pivot lugs in a frontal impact or collision event of the vehicle.

13. The system according to claim 11, wherein:
   each rear pivot lug has a through hole through which the rear pivot pin passes, and a slot extending from the through hole toward the rear of the vehicle; and
   a width of the slot is less than a diameter of the through hole.

14. A vehicle comprising:
   a center floor;
   a battery assembly disposed under the center floor;
   a pair of front side members;
   a front subframe disposed below the pair of front side members and located in front of the battery assembly, the front subframe being connected to the pair of front side members through a pair of support arms and a pair of support brackets, wherein each support arm of the pair of support arms is provided on the front subframe, and each support bracket of the pair of support brackets is provided on each front side member of the pair of front side members, respectively; and
   an electric motor mounted on the front subframe, wherein a front edge of the electric motor is connected to a front crossmember of the front subframe through a front connection portion and a rear edge of the electric motor is pivotally connected to a rear crossmember of the front subframe through a rear connection portion.

15. The vehicle according to claim 14, wherein each support arm of the pair of support arms is pivotally connected to each support bracket of the pair of support brackets through a pair of pivot pins, respectively.

16. The vehicle according to claim 15, wherein:
   the front subframe includes a pair of longitudinal members, a front crossmember connecting front portions of the pair of longitudinal members, and a rear crossmember connecting rear portions of the pair of longitudinal members;

each support arm of the pair of support arms protrudes from each longitudinal member of the pair of longitudinal members, respectively;

each support bracket of the pair of support brackets protrudes toward each support arm of the pair of support arms from each front side member of the pair of front side members, respectively; and each pivot pin of the pair of pivot pins extends through each support arm of the pair of support arms and each support bracket of the pair of support brackets, respectively.

17. The vehicle according to claim 16, wherein each longitudinal member of the pair of longitudinal members includes a notch that induces the longitudinal member to be deformed into a V-like shape in a frontal impact or collision event of the vehicle.

18. The vehicle according to claim 17, wherein the notch is recessed from a top surface of the longitudinal member toward a bottom of the vehicle.

19. The vehicle according to claim 17, wherein the notch is located in front of the support arm.

* * * * *